(12) United States Patent
Beauvent

(10) Patent No.: US 6,190,449 B1
(45) Date of Patent: Feb. 20, 2001

(54) METHOD FOR ELIMINATING WASTE SULFUROUS ACIDS COMING FROM INDUSTRIAL TREATMENTS AND FOR OBTAINING STABLE PRODUCTS

(75) Inventor: Guy Beauvent, Wierre Effroy (FR)

(73) Assignee: Carrieres du Boulonnais, Ferques (FR)

( * ) Notice: Under 35 U.S.C. 154(b), the term of this patent shall be extended for 0 days.

(21) Appl. No.: 09/056,097

(22) Filed: Apr. 7, 1998

(30) Foreign Application Priority Data

Apr. 8, 1997 (FR) .................................................. 97 04295

(51) Int. Cl.[7] ...................................................... C04B 7/32
(52) U.S. Cl. ........................ 106/692; 106/693; 106/695; 106/745
(58) Field of Search ................................. 106/745, 739, 106/725, 772, 786, 692, 693, 695

(56) References Cited

U.S. PATENT DOCUMENTS

| | | | |
|---|---|---|---|
| 3,870,535 | * | 3/1975 | Minnick et al. . |
| 4,997,486 | * | 3/1991 | Bolsing ................................. 106/778 |
| 5,495,064 | * | 2/1996 | James et al. .......................... 588/256 |

FOREIGN PATENT DOCUMENTS

| | | | |
|---|---|---|---|
| 46-038404 | * | 11/1971 | (JP) . |
| 405117001 | * | 5/1993 | (JP) . |
| 09067118 | * | 3/1997 | (JP) . |
| 937390 | * | 6/1982 | (SU) . |
| 897739 | * | 11/1982 | (SU) . |
| WO 96/33133 | * | 10/1996 | (WO) . |

OTHER PUBLICATIONS

Arliguie et al. "Etude De L'effect Retardateur du $Zin_c$ sur L'Hydration De La Pate De Ciment Portland" *Cement and Concrete Research*, vol. 12 No. 1 pp. 79–86, (1982).*

Arliquie et al. "Influence De La Compestion D'Un Ciment Portland Sur Son Hydration on En Presence De Zinc" *Cement & Concrete Research*, vol. 20, pp. 517–524 (1990).*

"Use of Wastes of Sulfuric Acid Production in Concretes" Remnov Prom St–Strait Mater, Ser. 11 (Nanchno–Tekh. Ref. 56) (8) 12–13, 1981. Abstract Only.*

* cited by examiner

Primary Examiner—Paul Marcantoni
(74) Attorney, Agent, or Firm—Browdy and Neimark

(57) ABSTRACT

The method comprises the steps of: preparing a belitic crude cement, neutralizing waste sulfurous acids by means of at least clay-calcareous fines which are thus transformed into artificial gypsum, and adding said artificial gypsum to the belitic crude cement.

9 Claims, 1 Drawing Sheet

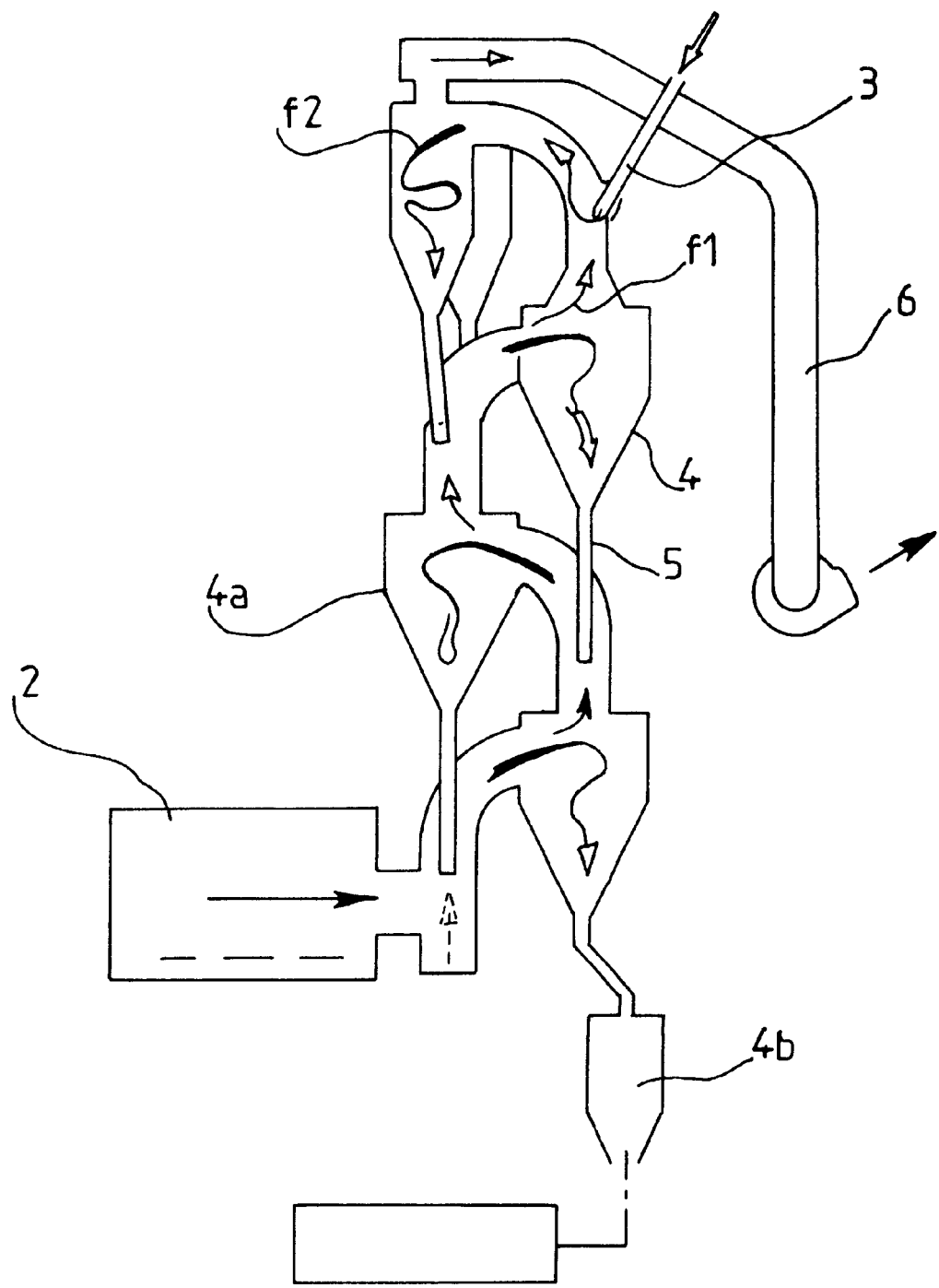

METHOD FOR ELIMINATING WASTE SULFUROUS ACIDS COMING FROM INDUSTRIAL TREATMENTS AND FOR OBTAINING STABLE PRODUCTS

FIELD OF THE INVENTION

BACKGROUND OF THE INVENTION

The present invention relates to treatment of waste sulfurous acids coming from plants in which various products are processed, in particular raw materials that contain titanium oxide and used for producing industrial $TiO_2$.

In the above application as well as in most of those related with sulfurous acids, great amounts of acid effluents must be evacuated or treated.

A re-treatment generally involves concentrating the diluted acids and separating the polluting elements such as fluorides, heavy metal oxides, aluminous residues, etc.

The above treatments are very costly and not satisfactory since the diluted acids can not be easily concentrated and can not be re-cycled a great number of times, and since there is still the problem of removing the separated polluting materials.

PURPOSE OF THE INVENTION

The present invention enables a complete recovery of waste acids and a use of the so-obtained product with mineral materials advantageously obtained by an other way from other waste products, and particularly from quarry muds, steel-works slags and other refuses.

The association of the products that are obtained within the scope of the invention enables then a manufacturing of basic materials, in particular stable building and inerting products that exhibit only a small shrinkage, or even no shrinkage at all, and a good mechanical strength of about 40–50 MPa during a setting cycle of about 28 days.

Moreover, the products that are made from the invention can be used for encapsulating heavy metals, in particular zinc oxides, which is made possible due to the very low porosity of the product made according to the invention.

SUMMARY OF THE INVENTION

According to the invention, in a method for eliminating waste sulfurous acids coming from industrial treatments and for obtaining stable products, there is prepared, on a first hand, a belitic crude cement and there is neutralized, on a second hand, the waste sulfurous acids by means at least of clay-calcareous fines which are thus transformed into articial gypsum and this articial gypsum is added to the belitic crude cement for adjusting the $SO_3$ amount in the belitic crude cement so as to obtain a clinker having a setting time which is variable according to the $SO_3$ amount, as well as other physico-chemical properties.

Various other features of the invention will moreover be revealed from the following detailed disclosure.

BRIEF DESCRIPTION OF THE DRAWING

A diagramatical view of a treating oven for carrying the process of the invention into effect is shown in the accompanying single figure.

DESCRIPTION OF THE PREFERRED EMBODIMENT

The method of the invention comprises mixing various diluted waste sulfurous acids ($SO_2$, $SO_3$, $SO_4H_2$) coming from industrial treatments, in particular treatments with sulfuric acids, such as anodizing treatments of aluminum, zinc deposition electrolytic treatments and other similar treatments, etc. The above mentioned acids are in a low concentration aqueous solution of about 1–35%, preferably near 10% at end of treatment. They may contain various residues.

The above mentioned waste acids are in particular loaded with residues that contain alumina, zinc and other metals or metallic oxides.

In the method of the invention, the waste acids are caused to react on clay-calcareous fines, for example fines containing 50–90% of $CaCO_3$. Such fines are, for example, obtained from washing crushed calcareous stones, sawing fines, etc.

The effect of the above waste acids on the fines is to neutralize these acids and to transform the fines into artificial gypsum or other mineral combinations such as an anhydrite.

Preferably, the crude product made of clay-calcareous fines, residues and clay-calcareous fines used for neutralizing the waste acids is treated in a granulator for forming granulates of 0.2–2 mm.

By an other way, a belitic crude cement is prepared by using, in particular, residues from washing calcareous stones containing about:

20–30% of $CaCO_3$

30–50% of clay

5–25% of $SiO_2$

5–25% of $Al_2O_3$ as residues

5–50% of various waste products able to be constituted by metallic oxides such as magnesium oxides, iron oxide, titanium oxide, etc., to which the fines of artificial gypsum are added.

The above fines are themselves treated in a granulator or by extrusion, and then thermally in a decarbonation enclosure up to a temperature which is generally of about 900° C. in order to reduce $CaCO_3$ into $CaO$ and $CO_2$. This portion of the equipment can be used as it stands for producing so-called flash lime from fines that are rich in $CaCO_3$.

The decarbonated fines are then brought to a temperature of about 1200° C. for obtaining crystallized forms having hydraulic properties of $(CaO)_2(SiO_2)$ β that are generally designated by C2Sβ, $C_4A_3S$, $C_4AF$, etc.

A particular feature of the invention is to mix the crude product that has been obtained with the gypsum already obtained by an other way, from the neutralization of waste acids so treated in order to promote the production of sulfo-aluminates that are formed from a temperature of about 1200° C., in order to obtain a clinker.

The addition of gypsum to the crushed clinker is made in a proportion that depends on the setting rapidity of the cement to be obtained and is normally comprised between 4 and 20% of order to obtain an amount in calcium sulfo-aluminate $C_4A_3\overline{S}$ of about 5–60%.

Upon manufacturing of the artificial gypsum coming at neutralization of waste acids, it is possible to add charges of polluting materials, for example heavy metal oxides, in particular zinc oxide, chromium oxide, titanium oxide, cadmium oxide, etc., and to mix the gypsum with the slow setting cement, which makes to make building products, in particular very quick setting parpens and similar, the cement that is obtained being without any shrinkage or practically so.

When the gypsum is mixed with the clinker, and then crushed, there is obtained a product which can renders (which means to make not polluting) heavy metals by a so-called cold encapsulating based on the expansion and without shrinkage properties of these products used as binders. It is also possible to make building elements in the shape of parpens, etc., based upon the quick setting properties.

In a variant of embodiment which can be used in iron works sites, it has been found advantageous to add to the formed crude products for the clay-calcareous fines, that have been treated with waste acid mixed with clay-calcareous fines and with muds containing aluminous compounds, steel works slags in a proportion of a 10–40%. Slags that contain 50% of CaO, 12% of iron oxide, 12% of silica and some metal residues have been found particularly suitable by making it possible a saving of power due to elimination of $Co_2$, and the supply of iron permitting to obtain belitic ferro-aluminous cements comprising sulfo-aluminates. The addition, to the crude products, of fluoride containing pollutants enables moreover a better mineralization and to gain ±100° C. on the calcination temperature.

Although various types of ovens can be used for obtaining the belitic sulfo-aluminous product and the calcination of the crude product that has been described, it is avantageous, as shown in the drawing, to use an oven with a riser pipe 1 and a recycling comprising one or a plurality of burners 2. The burners 2 are themselves made, for example, by one or a plurality of ovens and develop a temperature of about 1200° C. in the riser pipe in which are made to circulate the fins coming from the sludge granulates and the granulates that are top injected via a conduct 3 leading to a cyclone 4 which emerging at a re-injection conduit 5 leading to a second cyclone 4a, etc.

The products that have been so treated are re-injected in a counter-flow direction, as shown by arrows $f_1$, $f_2$, for providing a counter-flow circulation.

When the products must be submitted to a vitrification at a greater temperature upper than 1200° C., they are derived, for example from the cyclone 4b, to be passed in an other oven of a same type or of a different construction, for example a plasma oven or the like, a rotating oven or other.

When industrial or domestic refuses are used for heating, those burners 2 burn them and they may obviously be an integral part of the oven if the oven is of an other type than the oven with a riser pipe as shown in the drawing.

When it is necessary to proceed to a very high temperature treatment, for example a treatment at a temperature greater than 1200° C., it is avantageous to provide, in the main oven, for example within the riser pipe, a secondary oven cavity into which the product to be treated or the portion of product to be treated is introduced, this secondary oven cavity being pre-heated by the main oven, and the complementary heat source, for example a plasma torch, affecting only the inside of the complementary oven cavity.

The combined arrangement of two ovens or more can also be made when the main oven is a grating oven or a fluidized bed oven, or still an other type of oven permitting the simultaneous use of the calories coming from the residues. This arrangement therefore necessitates to bring expensive calories only for a relatively small temperature rise comprised between the temperature of the main oven and that of the secondary oven cavity which is used for the high temperature calcination. Subsidiarily, it is advantageous to treat the combustion gases at least in the main oven, for reducing them by means of a lime that has been produced in the equipment at certain times of the year in order, in particular, to ensure an absorption of $SO_2/SO_3$ which is then re-cycled, as explained, for the obtention of artificial gypsum.

The invention is not restricted to the embodiment that has been shown and described in detail since various modifications can be applied thereto without departing from the scope of the invention as shown in the following claims.

What is claimed is:

1. A method for manufacturing a belitic sulfo-aluminous aluminous cement comprising:
   (a) neutralizing waste sulfurous acids containing from 1 to 35 weight % of acid by adding thereto clay-calcareous fines to produce gypsum;
   (b) preparing a belitic crude cement from residues of washings of calcareous stones, said calcareous stones having a composition comprising:
   20–30 weight % $CaCO_3$
   30–50 weight % clay
   5–25 weight % $SiO_2$
   5–25 weight % $Al_2O_3$
   5–50 weight % of waste products comprising metal, oxides;
   (c) adding the gypsum obtained from step (a) to the belitic cement obtained from step (b) form a belitic sulfo-aluminous cement.

2. The method according to claim 1 wherein the belitic crude cement is treated in a granulator to make granulates ranging in size from 0.2 to 2 mm.

3. The method according to claim 2 wherein the granulates used for making the belitic crude cement are first heated to about 900° C. to obtain a lime product, and granulates remaining from said first heating are heated to a temperature of about 1200° C. to crystallize the granulates.

4. The method according to claim 3 wherein said granulates are crystallized to form $C_2S$-beta, $C_4A_3S$, and $C_{12}A_7$.

5. The method according to claim 1 comprising the further step of adding fluorides to the belitic crude cement.

6. The method according to claim 1 comprising the further step of adding iron-works slags in a proportion between 10 and 40 wt %.

7. A cement clinker obtained by (a) neutralizing waste sulfurous acids by adding thereto clay-calcareous fines to produce gypsum;
   (b) preparing a belitic crude cement from residues of washings of calcareous stones, said calcareous stones having a composition comprising:
   20–30 wt % $CaCO_3$
   30–50 wt % clay
   5–25 wt % $SiO_2$
   5–25 wt % $Al_2O_3$
   5–50 wt % of various waste products which comprise metal oxides;
   (c) adding the gypsum obtained from step (a) to the belitic cement obtained from step (b).

8. A process for encapsulating heavy metals comprising adding heavy metals to the clinker obtained in claim 7.

9. The process according to claim 7 wherein the heavy metals are selected from the group consisting of zinc oxides and lead oxides.

* * * * *